(12) United States Patent
Hill et al.

(10) Patent No.: US 8,529,123 B2
(45) Date of Patent: Sep. 10, 2013

(54) DEVICE AND METHOD FOR CALIBRATING A FIBER-OPTIC TEMPERATURE MEASURING SYSTEM

(75) Inventors: Wieland Hill, Odenthal (DE); Martin Fromme, Köln (DE); Jochen Kübler, Köln (DE)

(73) Assignee: Lios Technology, GmbH, Cologne (DE)

( * ) Notice: Subject to any disclaimer, the term of this patent is extended or adjusted under 35 U.S.C. 154(b) by 750 days.

(21) Appl. No.: 12/419,646

(22) Filed: Apr. 7, 2009

(65) Prior Publication Data

US 2009/0252193 A1 Oct. 8, 2009

(30) Foreign Application Priority Data

Apr. 7, 2008 (DE) .................. 10 2008 017 740

(51) Int. Cl.
*G01J 5/08* (2006.01)
*G01K 15/00* (2006.01)

(52) U.S. Cl.
USPC ................ 374/1; 374/130; 374/161; 374/129

(58) Field of Classification Search
USPC ............ 374/1, 121, 120, 129, 130–131, 161, 374/2
See application file for complete search history.

(56) References Cited

U.S. PATENT DOCUMENTS

| | | | | |
|---|---|---|---|---|
| 4,703,175 A * | 10/1987 | Salour et al. | ..................... | 356/45 |
| 4,769,820 A * | 9/1988 | Holmes | ........................... | 372/33 |
| 4,790,669 A * | 12/1988 | Christensen | .................. | 374/131 |
| 4,823,166 A * | 4/1989 | Hartog et al. | ................... | 356/44 |
| 4,830,513 A | 5/1989 | Grego | | |
| 4,964,131 A * | 10/1990 | Liu et al. | ........................... | 372/6 |
| 5,004,913 A * | 4/1991 | Kleinerman | .............. | 250/227.21 |
| 5,142,660 A * | 8/1992 | Chang et al. | .................... | 385/10 |
| 5,686,986 A | 11/1997 | Li et al. | | |
| 5,945,666 A * | 8/1999 | Kersey et al. | ............ | 250/227.14 |
| 6,069,686 A * | 5/2000 | Wang et al. | ................... | 356/35.5 |
| 6,174,092 B1 * | 1/2001 | Siala | ............................. | 385/91 |
| 6,424,455 B1 * | 7/2002 | Dmitri | .......................... | 359/334 |
| 6,490,538 B1 | 12/2002 | Glombitzs et al. | | |
| 6,570,659 B2 * | 5/2003 | Schmitt | ........................ | 356/479 |
| 7,126,680 B2 | 10/2006 | Yamate et al. | | |
| 7,486,978 B2 * | 2/2009 | Van Beek et al. | ............. | 600/341 |
| 7,509,008 B2 * | 3/2009 | Perales et al. | ................ | 385/100 |
| 7,515,271 B2 * | 4/2009 | Greening et al. | ............ | 356/463 |
| 7,602,501 B2 * | 10/2009 | Ralston et al. | ................ | 356/497 |
| 7,628,531 B2 * | 12/2009 | Lee et al. | ........................... | 374/1 |
| 7,982,879 B2 * | 7/2011 | Desjardins et al. | ........... | 356/477 |

(Continued)

FOREIGN PATENT DOCUMENTS

DE 37 81 122 T2 12/1992
DE 196 38 390 B4 3/1997

(Continued)

*Primary Examiner* — Gail Verbitsky
(74) *Attorney, Agent, or Firm* — Cheryl F. Cohen; Christa Hildebrand

(57) ABSTRACT

A device for calibrating a fiber-optic temperature measuring system has a broadband light source, a coupling-in device, which can couple light generated by the light source for calibration into an optical fiber of the temperature measuring system, a coupling-out device, which can couple components of the light source-generated light that are backscattered in the optical fiber out of the optical fiber. An evaluation device performs a calibration of the temperature measuring system on the basis of the backscattered components of the light.

16 Claims, 2 Drawing Sheets

(56) References Cited

U.S. PATENT DOCUMENTS

| | | | |
|---|---|---|---|
| 2005/0140966 A1* | 6/2005 | Yamate et al. | 356/73.1 |
| 2007/0013911 A1 | 1/2007 | DiFoggio | |
| 2007/0223556 A1 | 9/2007 | Lee et al. | |
| 2007/0236698 A1* | 10/2007 | Dogariu et al. | 356/479 |
| 2008/0085080 A1* | 4/2008 | Dimmick et al. | 385/37 |
| 2009/0185191 A1* | 7/2009 | Boppart et al. | 356/479 |
| 2009/0245320 A1* | 10/2009 | Timans | 374/2 |
| 2010/0110426 A1* | 5/2010 | Cicerone et al. | 356/301 |
| 2010/0302627 A1* | 12/2010 | Fermann et al. | 359/341.1 |

FOREIGN PATENT DOCUMENTS

| | | |
|---|---|---|
| DE | 10 2006 008 735 A1 | 2/2007 |
| EP | 0 692 705 A1 | 1/1996 |
| EP | 0 898 151 A2 | 2/1999 |
| JP | 08032102 A * | 2/1996 |
| WO | 2007/106827 A1 | 3/2007 |

* cited by examiner

DEVICE AND METHOD FOR CALIBRATING A FIBER-OPTIC TEMPERATURE MEASURING SYSTEM

CROSS-REFERENCE TO RELATED APPLICATION

This application claims the priority, under 35 U.S.C. §119, of German patent application DE 10 2008 017 740.8, filed Apr. 7, 2008; the prior application is herewith incorporated by reference in its entirety.

BACKGROUND OF THE INVENTION

Field of the Invention

The present invention relates to a device for calibrating a fiber-optic temperature measuring system, comprising a light source, coupling-in means, which can couple light generated by the light source for calibration into an optical fiber of the temperature measuring system, coupling-out means, which can couple components of the light generated by the light source which are backscattered in the optical fiber out of the optical fiber, and evaluation means, which can perform a calibration of the temperature measuring system on the basis of the backscattered components of the light from the light source. The invention further pertains to a method for calibrating a fiber-optic temperature measuring system.

Fiber-optic temperature measuring systems (Distributed Temperature Sensing—DTS) can utilize optical effects in optical fibers for spatially resolved temperature measurement. By way of example, the effect of Raman scattering can be utilized. In this case, the radiation from a narrowband source of electromagnetic radiation (e.g. that from a laser) is scattered inelastically in the fiber material. The ratio of the intensities of the scattered radiation having a shorter wavelength than the excitation (anti-Stokes scattered radiation) and of the scattered radiation at a longer wavelength (Stokes scattered radiation) is temperature-dependent and can be used for temperature determination. By utilizing frequency techniques (Optical Frequency Domain Reflectometry—OFDR) such as are described in European published patent applications EP 0 692 705 A1 and EP 0 898 151 A2 (cf. U.S. Pat. No. 6,490,538 B1), or pulse techniques (Optical Time-Domain Reflectrometry—OTDR), it is possible to determine the temperature along the fiber in spatially resolved fashion. Temperature measuring systems of this type can be used for example for fire monitoring in tunnels and channels, for monitoring power cables and pipelines and in oil and gas extraction.

A fundamental problem in the spatially resolved temperature measurement in optical fibers is the attenuation of the radiation during transport along the fiber. The exciting radiation is attenuated along the fiber. This reduces the scattering intensities and thus the signal/noise ratio of the measurement and ultimately limits the maximum distance and/or the resolution of such a temperature measurement. The attenuation of the excitation radiation acts in the same way on the anti-Stokes and Stokes components of the scattered light and, apart from the noise component, therefore has no influence on the result of the temperature calculation on the basis of the known formulae.

The situation is different with the anti-Stokes and Stokes components of the scattered light. These components have different wavelengths, at which the fiber material can bring about a different attenuation. This difference in attenuation alters the measured intensity ratio relative to the ratio determined by the local temperature at the scattering location. Therefore, the difference in attenuation should be taken into account in the temperature calculation.

The attenuations of the available fibers at the anti-Stokes and Stokes wavelengths are generally not known to a sufficient accuracy. Although the fibers have specific specifications with regard to the attenuation, and attenuation values of individual fiber batches are also measured, these specifications and measured values are generally not available for the wavelengths used in the spatially resolved temperature measurement. Moreover, the batch from which the fibers originate is not accurately known for every fiber installation. Furthermore, connecting locations, plugs, stresses and the bending of the fiber lead to additional attenuations. Even after the installation of a fiber, the attenuation thereof can still change as a result of mechanical, thermal or chemical loads. Finally, the attenuation of the fibers is also additionally dependent on the present local temperature.

Owing to the diverse influences on the fiber attenuation and the significance thereof for the correct determination of the local temperatures, measurements of the present attenuations along the optical fibers used for the measurements are desirable in particular for particularly accurate temperature measurements and for measurements in very long fibers.

One approach for determining the attenuation in the fibers consists in the application of commercial OTDR units. These emit a laser pulse into the fiber, measure the Rayleigh backscattering in time-resolved fashion and determine the attenuation from the backscattering curve. However, these units are available only for a few standard wavelengths in telecommunications, and generally not for the anti-Stokes and Stokes wavelengths. Moreover, two or three units would then be required for the temperature measurement, namely one or two OTDR units for measuring the attenuation at both wavelengths and the DTS unit. Furthermore, the narrowband laser light from an OTDR unit is not representative of the rather broadband Raman scattered light.

A device and a method of the type mentioned above are described in international patent application WO 2007/106827 (cf. US 2007/0223556 A1). There, a second laser is used for calibrating a DTS unit, the Stokes wavelength of the second laser corresponding to the anti-Stokes wavelength of the first laser. The Stokes signal of the second laser is used for calibrating the attenuation at the anti-Stokes wavelength of the first laser. However, this calibration is not independent or unambiguous, since the observed attenuation of the Stokes intensity of the first laser is the sum of the attenuation of the laser intensity on the forward path and the attenuation of the Stokes intensity on the return path. Moreover, this construction requires the use of a costly second laser and no calibration is effected at the Stokes wavelength of the first laser.

SUMMARY OF THE INVENTION

It is accordingly an object of the invention to provide a method and device for calibrating a fiber-optic temperature measurement system which overcomes the above-mentioned disadvantages of the heretofore-known devices and methods of this general type and which provides for a more effective device and a more effective method.

With the foregoing and other objects in view there is provided, in accordance with the invention, a device for calibrating a fiber-optic temperature measuring system having an optical fiber, comprising a broadband light source configured to generate light;

coupling-in means disposed to inject the light generated by said broadband light source for calibration into the optical fiber of the temperature measuring system;

coupling-out means configured to couple components of the light generated by said broadband light source and backscattered in the optical fiber out of the optical fiber; and an evaluation unit configured to calibrate the temperature measuring system based on the backscattered components of the light from the broadband light source.

In other words, the light source is a broadband light source. In a preferred embodiment, the light source is a superluminescence diode (SLED), for example. Diodes of this type are constructed similarly to a semiconductor laser, but have no resonator. SLEDs which can be coupled into an optical fiber and have bandwidths in the neighborhood of 100 nm and powers of several mW have become available in the meantime. Thus, the entire wavelength range relevant for the fiber-optic temperature measurement can be covered and the power is completely sufficient for a measurement of the fiber attenuation by means of Rayleigh scattering.

In this case, it may be advantageous that—apart from the light source and the coupling-in and/or coupling-out means—the same measurement set up as in the temperature measurement itself can be used. Moreover, the spectrum of the broadband light source is significantly more similar to that of the Raman scattering than that of a laser source. This has the advantage that properties of the temperature measuring system such as filter transmission curves, nonlinearity of the detectors and amplifiers, temporal response curves, and background and interference signals, affect the calibration measurement and the temperature measurement in a similar manner. Such properties can therefore be concomitantly compensated for equally by the calibration. This compensation can even concomitantly cover individual properties of the respective unit if the same measuring system is used for calibration and temperature measurement.

The device for calibration can either be realized as an independent unit or be integrated into the temperature measuring system itself. Geometrical coupling means for the alternate low-loss coupling-in from measuring laser and light source or else a (fiber-optic) switch can advantageously be used for the integration. The calibration integrated into the temperature measuring system is necessary if fiber attenuations change relatively rapidly for example on account of chemical influences such as $H_2S$ in oil extraction. The embodiment of the device as an independent unit is expedient if only small temporal variations of the attenuation are expected and in order to keep down the costs of the actual measuring unit.

SLED radiation sources are particularly advantageous for the calibration of OFDR-DTS. The SLEDs can be modulated in a similar manner to the semiconductor lasers used for the temperature measurement and have a practically unlimited lifetime with the typically low peak powers. Of course, light sources of this type can also be used in conjunction with OTDR-CTS. However, with the high peak powers, wear phenomena similar to those in the case of the pulsed lasers used are to be expected.

A simple coupling-in from the broadband light source and coupling-out of the radiation backscattered from the fiber to the detectors can be effected by means of a broadband beam splitter. However, half of the radiation power is in each case lost here in general both during the coupling-in and during the coupling-out. This might be acceptable for the calibration, but is at any rate disadvantageous if the same beam splitter is also used for the coupling-in from the measuring laser.

As an alternative to the beam splitter—at least in the case of measuring systems with multimode sensor fiber—a geometrical coupling can advantageously be used. This results in efficient coupling-in and coupling-out with no losses.

With the above and other objects in view there is also provided, in accordance with the invention, a method for calibrating a fiber-optic temperature measuring system which comprises the following method steps:

generating broadband light and coupling the light into an optical fiber of the temperature measuring system;

coupling components of the light that are backscattered in the optical fiber out of the optical fiber;

evaluating the backscattered components of the light; and calibrating the temperature measuring system on the basis of the evaluation.

In this case, a device according to the above-summarized invention can be used for carrying out the method.

Although the invention is illustrated and described herein as embodied in a device and method for calibrating a fiber-optic temperature measuring system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
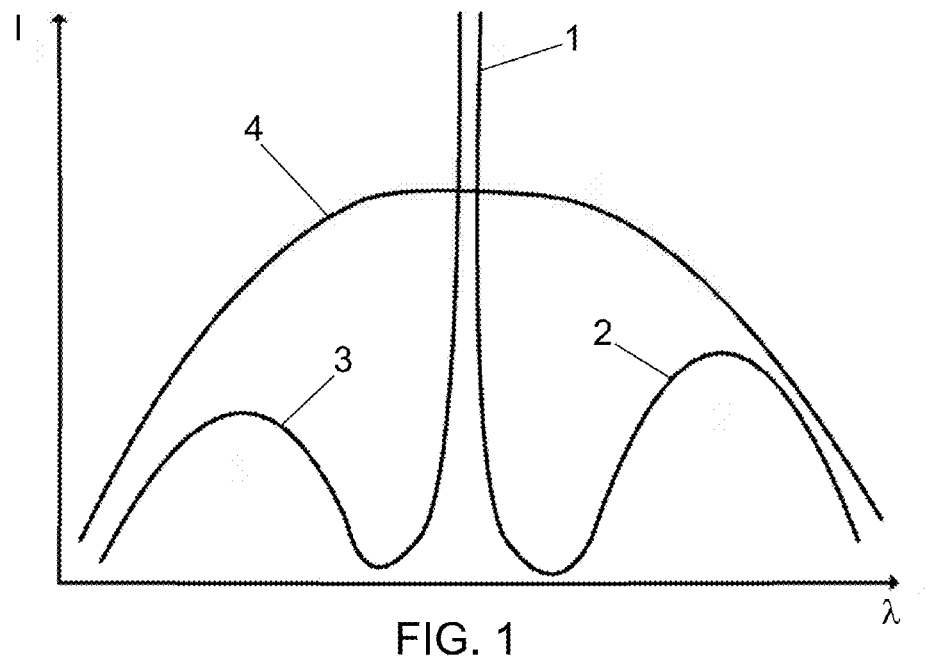
FIG. 1 shows the comparison of an emission spectrum of a superluminescence diode with the Raman spectrum of an optical fiber after excitation by a measuring laser (intensity in arbitrary units versus wavelength in arbitrary units)

Referring now to the figures of the drawing in detail and first, particularly, to FIG. 1 thereof, there is shown the Raman spectrum of an optical fiber after excitation of a measuring laser. In this case, reference numeral 1 denotes the Rayleigh scattered light, the wavelength of which corresponds to that of the measuring laser. Reference numeral 2 denotes the Stokes scattered radiation and reference numeral 3 denotes the anti-Stokes scattered radiation. A typical wavelength of the measuring laser is 980 nm, wherein the Stokes Raman band can then extend up to a wavelength of approximately 1020 nm and the anti-Stokes Raman band can extend up to a wavelength of 940 nm. A further typical wavelength of the measuring laser is 1064 nm, wherein the Stokes Raman band can then extend up to a wavelength of approximately 1110 nm and the anti-Stokes Raman band can extend up to a wavelength of 1020 nm. A further typical wavelength of the measuring laser is 1550 nm, wherein the Stokes Raman band can then extend up to a wavelength of approximately 1650 nm and the anti-Stokes Raman band can extend up to a wavelength of 1460 nm.

Furthermore, the emission spectrum 4 of a typical superluminescence diode is depicted in FIG. 1. It is clearly evident that this emission spectrum 4 has components both in the region of the Stokes scattered radiation 2 and in the region of the anti-Stokes scattered radiation 3. In this case, the bandwidth of the light from the superluminescence diode is greater than that of the Stokes scattered radiation 2 and/or the anti-Stokes scattered radiation 3. In particular, the emission spectrum 4 of the superluminescence diode has both components having a longer wavelength than the longest-wave components of the Stokes scattered radiation 2 and components having a shorter wavelength than the shortest-wave components of the anti-Stokes scattered radiation 3. The emission spectrum 4 thus covers the spectral ranges of the Stokes scattered radiation 2 and of the anti-Stokes scattered radiation 3 well and is comparatively similar to the Raman spectrum. This applies in particular to the spectral ranges which can pass through the band pass filters (described in more detail below), upstream of the detectors (likewise still to be described).

Figure 2:
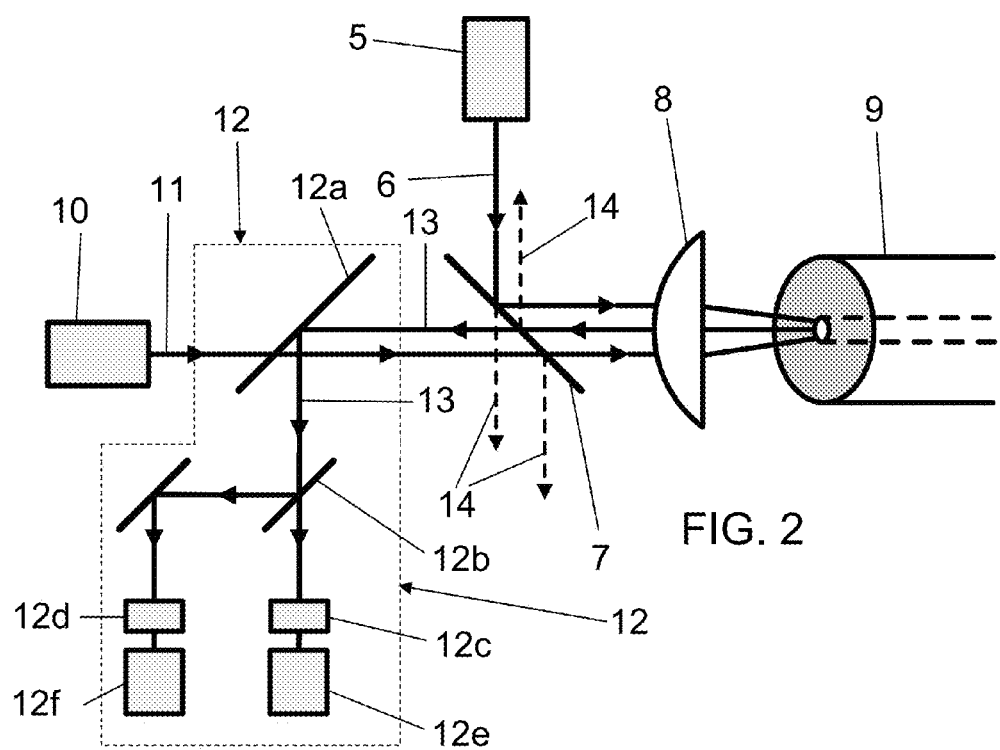
FIG. 2 shows a schematic view of a first embodiment of a device according to the invention.

The embodiment of a device according to the invention that is illustrated in FIG. 2 comprises a broadband light source 5, which is embodied as a superluminescence diode and which can be driven by a driver or drive means. The light 6 from the light source 5 is coupled, via coupling-in means comprising a broadband beam splitter 7 and a lens 8, into an optical fiber 9 of the temperature measuring system. The optical fiber 9 is used for temperature measurement.

The temperature measuring system comprises, in addition to the optical fiber 9, a measuring laser 10, the light 11 from which can likewise be coupled into the optical fiber 9 via the beam splitter 7 and the lens 8. Furthermore, the temperature measuring system comprises schematically indicated evaluation means 12. In the exemplary embodiment in accordance with FIG. 2, the evaluation means 12 in the form of an evaluation unit 12 comprises a spectral splitter 12a for the laser wavelength and the Raman scattered radiation unit, a spectral splitter 12b for the Stokes and anti-Stokes scattered radiation, two filters 12c, 12d, and two detectors 12e, 12f for the Stokes and anti-Stokes scattered radiation. Furthermore, the schematically indicated evaluation means 12 are additionally also intended to comprise a measuring amplifier and an evaluation unit. Furthermore, a detector for the Rayleigh wavelength may possibly also be provided.

The lens 8 and the beam splitter 7 also serve as coupling-out means and can pass the components 13 of the light 6 generated by the light source 5 which are backscattered in the optical fiber 9 to the evaluation means 12. The evaluation means 12 can also serve for the evaluation of the backscattered components 13 of the broadband light source 5 embodied as a superluminescence diode, wherein they can determine in particular the attenuation of specific Stokes and anti-Stokes wavelengths in the optical fiber 9, in particular in spatially resolved fashion.

The spatially resolved determination of the attenuation of specific Stokes and anti-Stokes wavelengths in the optical fiber 9 can be effected here by a method corresponding to the OFDR method such as is described in the above-mentioned European published patent application EP 0 692 705 A1. In particular, here the light 6 from the broadband light source 5 embodied as a superluminescence diode can be frequency-modulated and a Fourier transformation can be carried out in the evaluation means 12. A calibration of the actual temperature measuring system is possible on the basis of this evaluation.

The reference symbols 14 denote light components which do not contribute to the calibration or to the temperature measurement and thus increase the losses.

Figure 3:
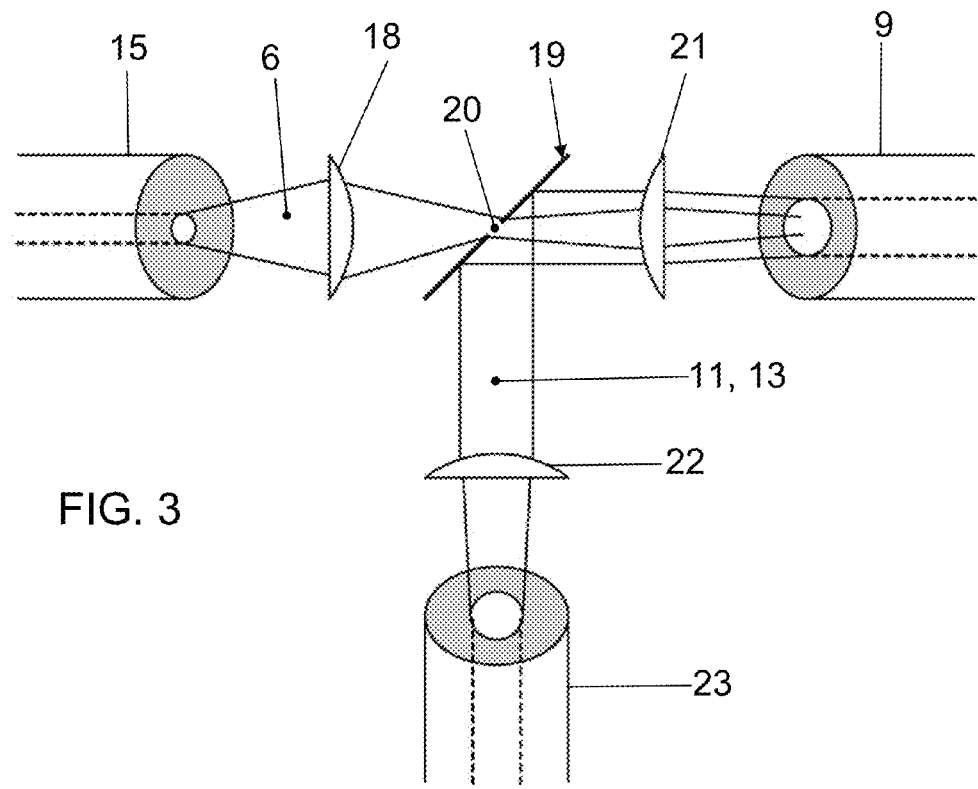
FIG. 3 shows a schematic view of a detail of a second embodiment of a device according to the invention.
Figure 4:
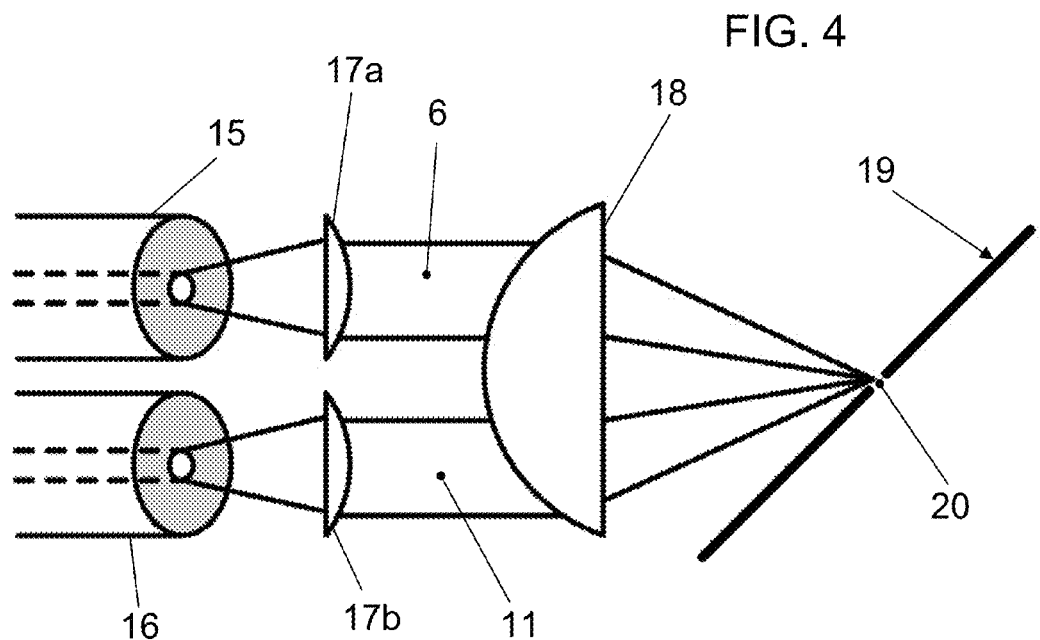
FIG. 4 shows a schematic view of a detail of a third embodiment of a device according to the invention.

The embodiments illustrated in FIGS. 3 and 4 avoid such losses at least in part. As an alternative to the beam splitter 7—at least in the case of measuring systems with multimode sensor fiber—a geometrical coupling can advantageously be used. The embodiments in accordance with FIG. 3 and FIG. 4 differ in that, in the case of the embodiment in accordance with FIG. 3, the light 6 from the broadband light source 5 embodied as a superluminescence diode is fed from the left and the light 11 from the measuring laser 10 is fed from below, whereas in the case of the embodiment in accordance with FIG. 4 both the light 6 from light source 5 and the light 11 from the measuring laser 10 are fed from the left. In FIG. 4, the illustration of the parts arranged to the right of and beneath the geometrical coupling described below has been dispensed with for reasons of clarity (in this respect, see also FIG. 3).

In the case of the embodiment in accordance with FIG. 4, both the light 11 from the measuring laser 10 and the light 6 from the broadband light source 5 embodied as superluminescence diode are firstly coupled into a respective single-mode fiber 15, 16. The single-mode fibers 15, 16 typically have fiber cores having a diameter of 4 to 10 µm. The ends of the fiber cores of the single-mode fibers 15, 16 are imaged in a suitable manner via lenses 17a, 17b, 18 onto the rear side of a special inclined mirror 19 composed for example of coated glass. The mirror 19 has at least one opening 20 or at least one transmissive region through which the light 11 from the measuring laser 10 and the light 6 from the light source 5 can pass.

The optical fiber 9 used for temperature measurement in the temperature measuring system is embodied as a multimode fiber having a typical core diameter of 50 µm or 62.5 µm (in this respect, see FIG. 3). The end of the core of the optical fiber 9 is imaged through a lens 21 onto the front side of the mirror 19 in such a way that the numerical aperture of both imagings is approximately identical. The image of the optical fiber 9 used for temperature measurement is then significantly larger than that of the single-mode fibers 15, 16. The majority of the light components 13 emerging from the optical fiber 9 can thus be reflected by the mirror 19 and be coupled via a further lens 22 into a further optical fiber 23. This further optical fiber 23 can likewise be embodied as a multimode fiber having a typical core diameter of 50 µm or 62.5 µm and pass the backscattered components 13 to the evaluation means 12. Instead of the coupling into the further optical fiber 23, the light components 13 reflected at the mirror 19 can also be passed directly to the evaluation means 12.

Since the mirror 19, in the region of the images of the single-mode fibers 15, 16, has at least one opening 20 or is transmissive to their radiation, while the rest of the mirror 19 reflects the measurement wavelengths of the Stokes and anti-Stokes signals, this results in efficient coupling-in and coupling-out.

In this case, it may possibly also be provided that the region of the image of the single-mode fiber 15 for the light 11 from the measuring laser 10 reflects the measurement wavelengths of the Stokes and anti-Stokes signals.

In the case of the embodiment in accordance with FIG. 3, only one single-mode fiber 15 is provided, through which only the light 6 from the broadband light source 5 embodied as a superluminescence diode is fed. In contrast, the light 11 from the measuring laser 10 is passed from below through the optical fiber 23 or directly onto the mirror 19. On that side of the optical fiber 23 which is remote from the mirror 19, therefore beam splitter means are provided which enable a coupling-in of the light 11 from the measuring laser 10, on the one hand, and a coupling-out of the components 13 to be evaluated, on the other hand.

The invention claimed is:

1. A device for calibrating a fiber-optic temperature measuring system taking into account spatially resolved attenuation measurements along an optical fiber, comprising:
   a broadband light source configured to generate light;
   coupling means for coupling-in the light generated by said broadband light source for calibration into the optical fiber; and the coupling means coupling-out components of the light generated by said broadband light source and backscattered out of the optical fiber;
   an evaluation unit configured to calibrate the spatially resolved attenuation measurements based on the backscattered components of the light from the broadband light source; and
   a laser coupled into the optical fiber for temperature measurement,
   wherein said evaluation unit is configured to calibrate the spatially resolved attenuation measurements based on a ratio of an intensity of the Stokes scattered radiation to an intensity of the anti-Stokes scattered radiation of light from the laser coupled into the optical fiber for temperature measurement;
   wherein the light generated by said broadband light source has a bandwidth greater than a bandwidth of the Stokes and/or anti-Stokes scattered radiation of the light from the laser that is coupled into the optical fiber.

2. The device according to claim 1, wherein a bandwidth of the light generated by said broadband light source is greater than 10 nm.

3. The device according to claim 1, wherein a bandwidth of the light generated by said broadband light source is greater than 30 nm.

4. The device according to claim 1, wherein a bandwidth of the light generated by said broadband light source is greater than 50 nm.

5. The device according to claim 1, wherein a bandwidth of the light generated by said broadband light source is greater than 100 nm.

6. The device according to claim 1, wherein said broadband light source is a super-luminescence diode.

7. The device according to claim 1, wherein the light generated by said broadband light source includes components in a spectral range of the Stokes and/or anti-Stokes scattered radiation of the light from the laser that is coupled into the optical fiber.

8. The device according to claim 1, wherein the light generated by said broadband light source has a bandwidth at least half of a bandwidth of the Stokes and/or anti-Stokes scattered radiation of the light from the laser that is coupled into the optical fiber.

9. The device according to claim 1, wherein the coupling means is a geometrical coupling means.

10. The device according to claim 1, wherein the coupling means comprises a mirror with an opening or a region that is at least partly transmissive to the light from the broadband light source.

11. The device according to claim 1, wherein the coupling means comprises a beam splitter.

12. The device according to claim 1, wherein the coupling means comprises an optical switch.

13. The device according to claim 12, wherein said optical switch is a fiber switch.

14. The device according to claim 1, integrated into the temperature measuring system, wherein said evaluation unit forms a part of an evaluation system of the temperature measuring system.

15. The device according to claim 1, configured as a separate unit, embodied separately from the temperature measuring system.

16. A method for using the device in accordance with claim 1, which comprises the following method steps:
   generating the broadband light;
   coupling the broadband light into the optical fiber;
   coupling components of the broadband light that are backscattered out of the optical fiber;
   evaluating Stokes and anti-Stokes backscattered components of the light; and
   calibrating the spatially resolved attenuation measurements based on the ratio of the intensity of the Stokes backscattered light to the intensity of the anti-Stokes backscattered light from the laser coupled into the optical fiber on the basis of the evaluating step.

* * * * *